Aug. 7, 1928.
G. BROWN ET AL
1,679,349
METHOD OF FORMING PROJECTIONS IN RECESSES
Filed May 7, 1924
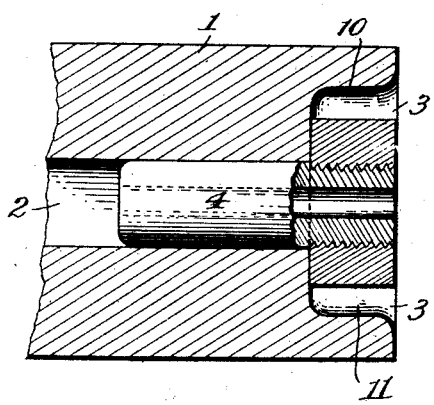
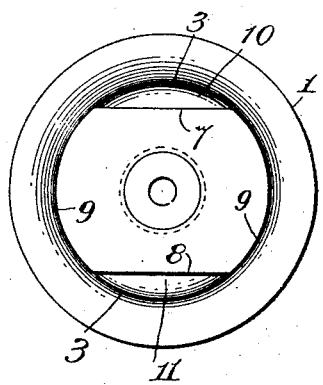
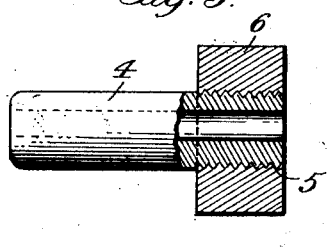
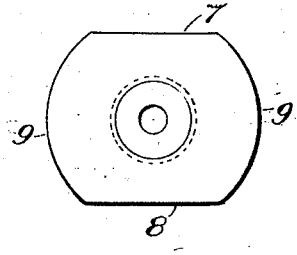
Inventors
George Brown & Abraham B. Apple,
By
Milans & Milans Attorneys.
Witness:
Jas. E. Hutchinson.

Patented Aug. 7, 1928.

1,679,349

UNITED STATES PATENT OFFICE.

GEORGE BROWN, OF ONEONTA, AND ABRAHAM B. APPLER, OF ALBANY, NEW YORK.

METHOD OF FORMING PROJECTIONS IN RECESSES.

Application filed May 7, 1924. Serial No. 711,735.

Our invention relates to a new and useful method of forming projections within the recess in the end of a crank pin or the like and a die or form adapted to be positioned within the recess to shape said projections during their welding or formation in other suitable manner, the primary object of the invention residing in providing means for forming an irregular shaped recess in the end of a crank pin or the like to receive a similarly shaped projection formed on the crank pin collar, the method and die being equally well adapted for forming such an irregularly shaped recess in new crank pins or in old crank pins which usually have a circular recess formed in the end thereof.

A further object of the invention resides in the provision of a die including a removable head so that heads of various shapes and sizes may be used to form recesses in the ends of the crank pins of different shapes or sizes.

With the above and other objects in view, which will appear as the description proceeds, our invention consists in the novel details of construction and arrangement of parts described in the following specification and illustrated in the accompanying drawings, and while we have illustrated and described the preferred embodiments of the invention as they now appear to us it will be understood that such changes may be made as will fall within the scope of the appended claims.

In the drawings:

Fig. 1 is a longitudinal vertical section through a portion of a crank pin showing our improved form of die in side elevation.

Fig. 2 is an end view of the pin with the die or form in position.

Fig. 3 is a side elevation of the die or form, and

Fig. 4 is an end view of Fig. 3.

In the drawings 1 indicates the crank pin having a longitudinally extending central bore 2 and the recess 3 in the end thereof. In the usual formation of a crank pin the recess in the end thereof is circular in shape to receive a circular projection formed on a collar which is secured to the end of the pin. It is the object of our present invention to provide means for forming the recess in the end of the pin of irregular shape to receive an irregularly shaped projection on a collar as disclosed in our copending application filed May 7, 1924, Serial No. 711,734. The recess is formed of irregular shape by welding or otherwise securing therein a projection or projections.

In forming the irregular shaped recess we use our improved form of die which is of the construction more particularly illustrated in Figs. 3 and 4 of the drawings. The die comprises the shank portion 4 which is exteriorly threaded at one end as shown at 5 to receive the head 6 which is provided with an interiorly threaded opening. The head 6 will be of brass or other such material as will not adhere to the welded surface. The head illustrated is of elongated shape having the flat upper surface 7 and lower surface 8 and the rounded ends 9.

When a projection or projections is to be secured within the recess the die is positioned with respect to the pin as quite clearly illustrated in Figs. 1 and 2 of the drawings, the shank 4 extending into the bore 2 and the head 6 being received in the recess. When the head is of the shape illustrated it leaves the spaces 10 and 11 between the wall of the recess and the head and the metal to be welded to the pin is placed in these recesses. After the welding has taken place the die will be removed and the recess in the end of the pin will be of the desired irregular shape. By having the head detachably connected to the shank heads of different shapes and sizes may be used to form recesses of different shapes and sizes within the end of the pin.

While we have particularly described our method as being of use for forming recesses in crank pins or the like we wish it understood that the same method may be used for forming recesses in other parts of machinery whether the machinery is of a portable or stationary type and where it is desired to reclaim worn holes or surfaces by welding projections or turning up worn holes or openings without removal from the machine or place where such parts are located, thereby saving time and expense in repairs.

Having fully described our invention what we claim as new and desire to secure by Letters Patent is:

1. The herein described method of forming an irregular shaped recess in a crank pin or the like having a recess in the end thereof, which consists in placing in said recess a die of the shape to form the irregular shaped recess and of a size not to entirely fill the recess, then filling the space between the die and the wall of the recess with metal, and then securing the metal received in the space to the wall of the recess.

2. The herein described method of forming an irregular shaped recess in a crank pin or the like having a recess in the end thereof, which consists in placing in said recess a die of the shape to form the irregular shaped recess and of a size not to entirely fill the recess, then filling the space between the die and the wall of the recess with metal, and then securing the metal received in the space to the wall of the recess by welding.

In testimony whereof we hereunto affix our signatures.

GEORGE BROWN.
ABRAHAM B. APPLER.